(12) United States Patent
Leonard (10) Patent No.: US 10,472,792 B2
(45) Date of Patent: Nov. 12, 2019

(54) TOWER FLANGE FOR A WIND TURBINE

(71) Applicant: General Electric Company, Schenectady, NY (US)

(72) Inventor: Jay F. Leonard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 15/596,065

(22) Filed: May 16, 2017

(65) Prior Publication Data
US 2018/0335022 A1 Nov. 22, 2018

(51) Int. Cl.
*E02D 27/42* (2006.01)
*F03D 13/20* (2016.01)

(52) U.S. Cl.
CPC .......... *E02D 27/425* (2013.01); *F03D 13/22* (2016.05); *F05B 2240/912* (2013.01); *F05B 2260/30* (2013.01)

(58) Field of Classification Search
CPC .......... F03D 13/20; F03D 13/25; F03D 80/70; F03D 7/0204; E02D 27/425; F05D 2240/912; F05D 2260/30
USPC .......... 52/848, 849, 223.5, 296, 297
See application file for complete search history.

(56) References Cited

U.S. PATENT DOCUMENTS

| | | | | |
|---|---|---|---|---|
| 8,443,557 B2* | 5/2013 | Gevers | .................... | E02D 27/42 52/170 |
| 8,826,614 B2* | 9/2014 | Garcia Maestre | .... | E04H 12/085 52/223.5 |
| 9,003,721 B1* | 4/2015 | Jensen | .................. | E02D 27/425 52/126.1 |
| 2011/0154757 A1 | 6/2011 | Rosengren | | |
| 2012/0137620 A1 | 6/2012 | Gevers et al. | | |
| 2012/0137622 A1* | 6/2012 | Patterson | .............. | E02B 17/027 52/651.01 |
| 2013/0199117 A1* | 8/2013 | Tuominen | ............... | E02D 27/42 52/297 |

(Continued)

FOREIGN PATENT DOCUMENTS

| | | |
|---|---|---|
| EP | 2 192 245 B1 | 6/2010 |
| EP | 2 388 479 A1 | 11/2011 |
| KR | 101635177 B1 | 7/2016 |

OTHER PUBLICATIONS

U.S. Appl. No. 15/230,790, filed Aug. 8, 2016.

(Continued)

*Primary Examiner* — Charles G Freay
(74) *Attorney, Agent, or Firm* — Dority & Manning, P.A.

(57) ABSTRACT

The present disclosure is directed to a tower assembly for a wind turbine having a tower flange that can accommodate foundations and/or nacelles of varying sizes. The tower assembly includes one or more tower sections having an integral tower flange that can be secured to a foundation, atop the tower section(s), and/or at a mid-height tower location. Further, the tower flange includes a substantially cylindrical wall defining an outer diameter and an inner diameter separated by an increased radial thickness. Thus, a radial offset is defined between the outer diameter of the tower flange and the corresponding tower component, i.e. the foundation, another tower section, or a yaw bearing. Accordingly, the larger radial thickness of the tower flange allows the flange to accommodate foundations or turbines of varying sizes with one common tower.

15 Claims, 9 Drawing Sheets

(56) References Cited

U.S. PATENT DOCUMENTS

2014/0069046 A1* 3/2014 Cai .................. E04H 12/08
　　　　　　　　　　　　　　　　52/651.01

OTHER PUBLICATIONS

U.S. Appl. No. 15/423,872, filed Feb. 3, 2017.
International Search Report and Written Opinion issued in connection with corresponding PCT Application No. PCT/US18/31323 dated Dec. 11, 2018.

* cited by examiner

TOWER FLANGE FOR A WIND TURBINE

FIELD OF THE INVENTION

The present invention relates generally to wind turbines, and more particularly, to tower flanges for wind turbines that can accommodate foundations or turbines of varying sizes with one common tower.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a main shaft coupling the rotor blades to a gearbox, or if a gearbox is not used, directly to the generator. The generator then converts the mechanical energy to electrical energy that may be deployed to a utility grid.

The wind turbine tower typically includes a base tower section secured to a foundation and one or more upper tower sections secured atop the base tower section. The foundation may be a concrete slab foundation, an anchor cage foundation, or any other suitable foundation capable of supporting loads produced by the wind and/or gravitational forces. For typical wind turbines, the base tower section may be secured directly to the foundation. Alternatively, e.g. where the manufacturer of the foundation and the tower are different, such as in a repower situation, a tower base adapter may be required since the bolt holes of the base tower section and the foundation do not align. In other words, for each different tower configuration, either a separate tower adaptor and/or a redesign of the base tower section are required.

Accordingly, an improved tower flange for a wind turbine tower that addresses the aforementioned issues would be desired in the art. Thus, the present disclosure is directed to a tower flange for a wind turbine tower that can accommodate machine heads (i.e. nacelles) or foundations of varying sizes.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a tower assembly for securing a tower of a wind turbine to a foundation. The tower assembly includes a base tower section and a tower flange integral with the base tower section. The tower flange includes a substantially cylindrical wall defining an outer diameter and an inner diameter separated by a radial thickness. Further, the radial thickness is oversized to accommodate foundations of varying sizes. The tower assembly also includes a foundation having a base portion and a mounting portion embedded within the base portion. The mounting portion defines an outer diameter and an inner diameter separated by a radial thickness. Further, the tower flange is secured to the mounting portion of the foundation. Thus, a radial offset is defined between the outer diameter of the tower flange and the outer diameter of the foundation.

In one embodiment, the radial thickness of the tower flange is greater than the radial thickness of the foundation. In another embodiment, the cylindrical wall of the tower flange further defines a height. More specifically, in certain embodiments, the height may be oversized as a function of material stress requirements so as to accommodate the radial offset.

In additional embodiments, the outer diameter of the tower flange is greater than the outer diameter of the mounting portion of the foundation. In alternative embodiments, the outer diameter of the tower flange is less than the outer diameter of the mounting portion of the foundation.

In further embodiments, the tower flange is further configured to accommodate a variety of bolt hole patterns. In other words, by having a larger radial thickness, the tower flange is able to accommodate a wide range of bolt hole patterns such that a chosen bolt holt pattern can be machined into the tower flange to align with bolt hole pattern of the foundation without changing the forged tower flange.

In another aspect, the present disclosure is directed to a tower assembly for a tower of a wind turbine. The tower assembly includes a first tower section, a second tower section, and a tower flange integral with each of the first tower section and the second tower section. The tower flange has a substantially cylindrical wall defining an outer diameter and an inner diameter separated by a radial thickness. Further, the radial thickness of one of the flanges is oversized to accommodate tower sections of varying sizes. Thus, the tower assembly also includes a radial offset defined between the outer diameter of the tower flange and an outer diameter of at least one of the first tower section or the second tower section. It should be understood that the tower flange assembly may further include any of the additional features and/or embodiments as described herein.

In yet another aspect, the present disclosure is directed to a wind turbine. The wind turbine includes a tower having at least one upper tower section. The upper tower section has a tower flange integral therewith. The tower flange has a substantially cylindrical wall defining an outer diameter and an inner diameter separated by a radial thickness. The radial thickness is oversized to accommodate yaw bearings of varying sizes. The wind turbine also includes a nacelle configured atop the tower and a yaw bearing coupled to the tower flange and the nacelle to permit rotation of the nacelle about a yaw axis. Thus, a radial offset is defined between the outer diameter of the tower flange and an outer diameter of the yaw bearing. It should be understood that the wind turbine may further include any of the additional features and/or embodiments as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a tower flange for a wind turbine that can accommodate nacelles or foundations of varying sizes. For example, the tower flange of the present disclosure can adapt a common tower to foundations of various sizes. Alternatively, the tower flange of the present disclosure can adapt a common tower to machine heads with various size yaw bearings. Conventional tower flanges are typically sized to optimize the amount of material needed for manufacturing, i.e. due the costs associated with steel. The load path of the structural tower wall is radially aligned keeping stresses and material usage low. Structural connection bolts are placed quite close to the shell wall, which keeps the radial thickness of the typical tower flange small. In contrast, the tower flange of the present disclosure is intentionally oversized such that the flange has a wide horizontal surface and can be used in many different sized bolt patterns within the same forged flange. Thus, the larger radial thickness of the tower flange allows the flange to adapt a standard tower to foundations of various sizes or to machine heads with various size yaw bearings. More specifically, the larger radial flat land space, i.e. referred to herein as the radial thickness, allows the tower flange to be machined to many possible bolt hole patterns. In addition, the tower flange may be thicker, i.e. having an increased vertical height, to handle non-ideal structural geometries, e.g. where the main load path is radially offset due to the diameter of the mating component being larger or smaller. Such a tower flange enables a single or few tower designs (e.g. structure and/or internals) to potentially be used with a range of mating parts (e.g. a foundation, yaw bearing, or mid-height tower sections).

Figure 1:
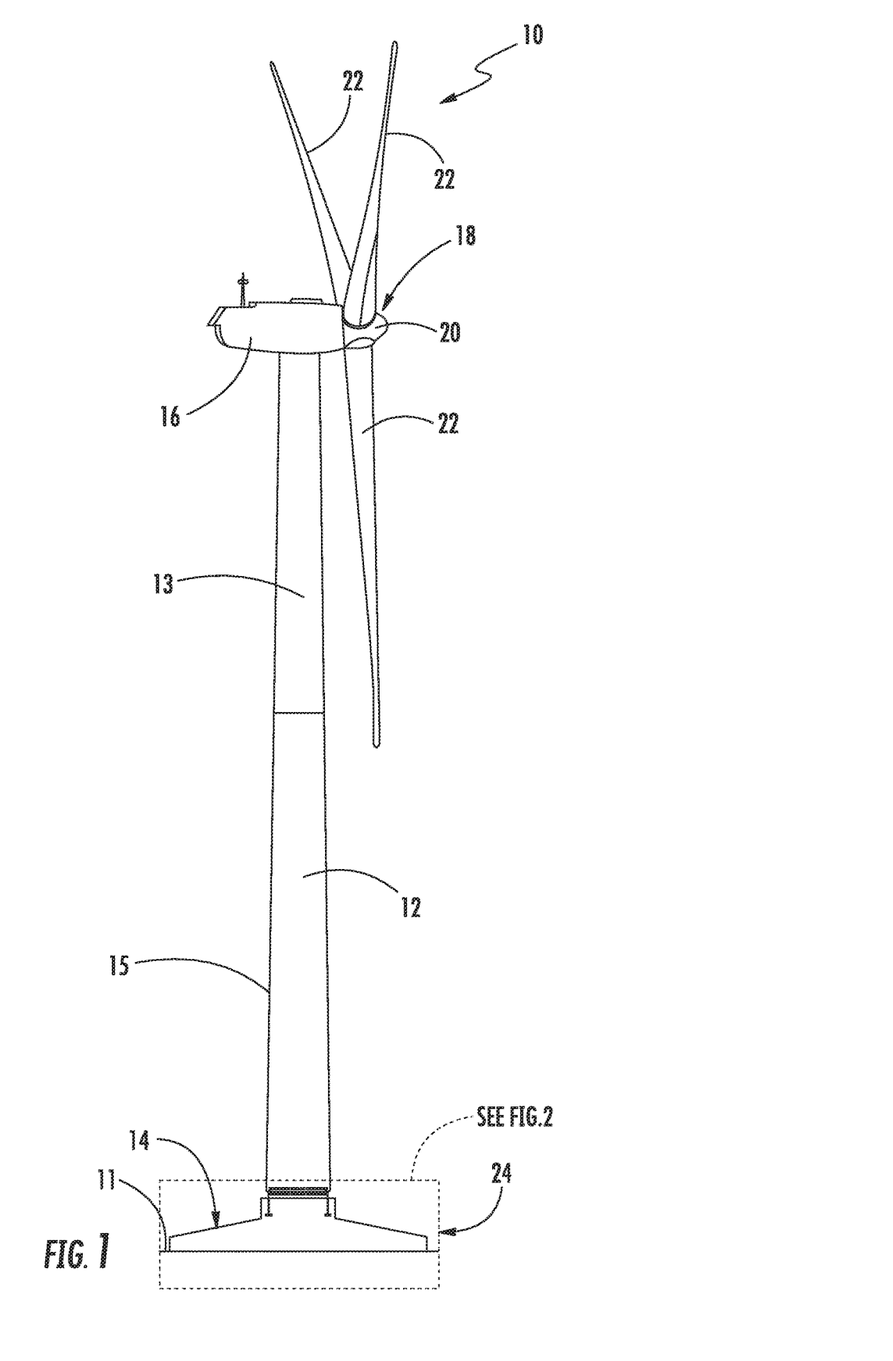
FIG. 1 illustrates a perspective view of one embodiment of a wind turbine according to the present disclosure.

Referring to the drawings, FIG. 1 illustrates a perspective view of one embodiment of a wind turbine 10 according to the present disclosure. As shown, the wind turbine 10 includes a tower 12 extending from a foundation 14 that sits upon a support surface, a nacelle 16 mounted on the tower 12, and a rotor 18 coupled to the nacelle 16. The tower 12 includes a base tower section 15 and at least one upper section 13. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy.

Figure 2:
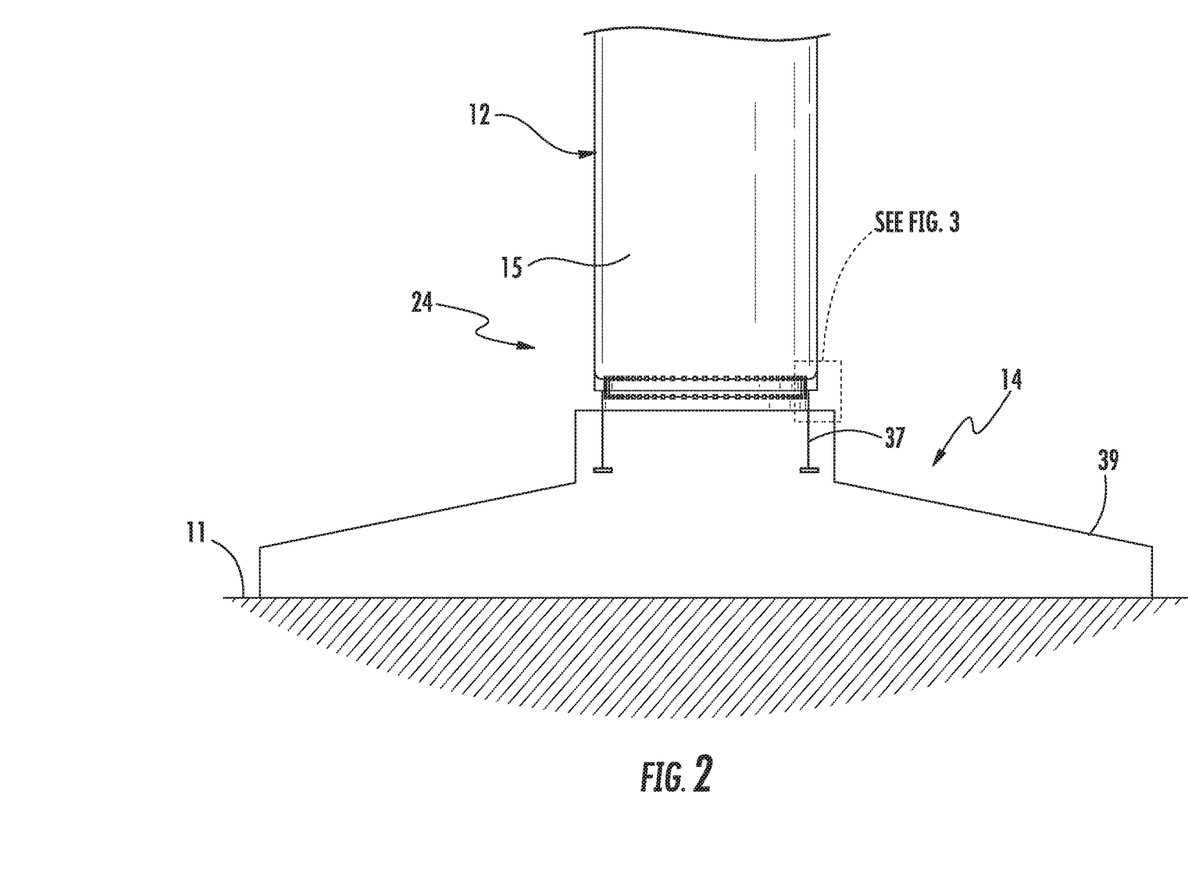
FIG. 2 illustrates an elevation view of one embodiment of a tower flange assembly securing a base tower section of a wind turbine to a foundation according to the present disclosure.
Figure 3:
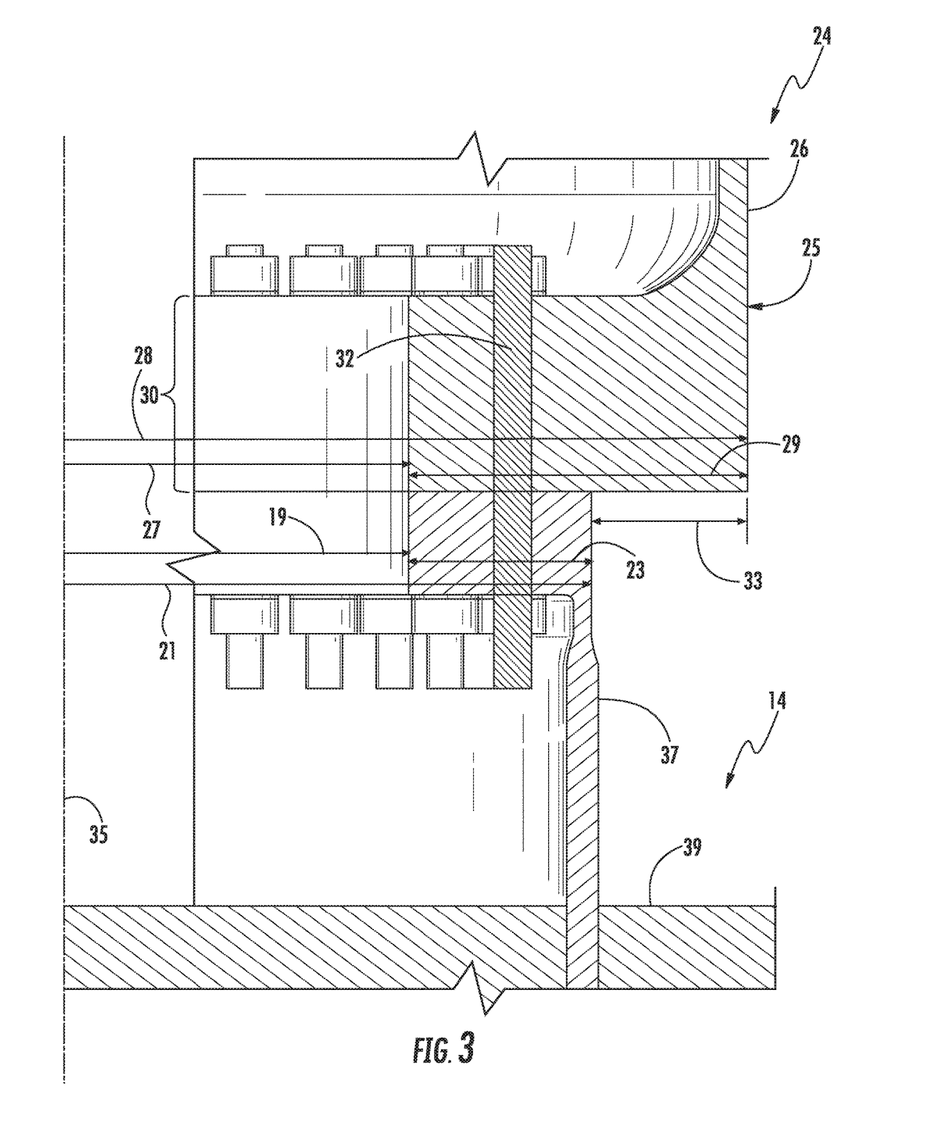
FIG. 3 illustrates a detailed view of the tower flange assembly of FIG. 2.

As shown in FIGS. 2 and 3, various embodiments of a tower assembly 24 secured to the foundation 14 according to the present disclosure are illustrated. FIG. 2 illustrates a partial, elevation view of one embodiment of the tower assembly 24 secured to the foundation 14. FIG. 3 illustrates a detailed view of the tower assembly 24 of FIG. 2. More specifically, as shown, the tower assembly 24 includes the base tower section 15 and a tower flange 25 that is integral with the base tower section 15. Further, as shown, the foundation 14 includes a base portion 39 and a mounting portion 27. For instance, as shown, the base portion 39 corresponds to a concrete slab foundation, whereas the mounting portion 37 corresponds to a steel mounting ring that is embedded into the base portion 39. Further, as shown particularly in FIG. 3, the tower flange 25 of the base tower section 15 may be secured to the foundation 14 by anchor bolts 32. It should be understood that the anchor bolts 32 may be located outside of the tower, inside the tower (as shown), or both. In addition, the tower assembly 24 may be secured to the foundation 14 using any other suitable means in addition to the anchor bolts 32.

Referring particularly to FIG. 3, the tower flange 25 may include a substantially cylindrical wall 26 defining an outer diameter 28 and an inner diameter 27 separated by a radial thickness 29. Similarly, the mounting portion 37 of the foundation 14 may include an outer diameter 21 and an inner diameter 19 separated by a radial thickness 23. Thus, as shown, the radial thickness 29 of the tower flange 25 may be greater than the radial thickness 23 of the mounting ring 37 so as to accommodate foundations of varying sizes. Therefore, as mentioned, the larger radial thickness of the tower flange 25 allows the flange 25 to fit most foundation sizes. In addition, as shown, a radial offset 33 in the structural load path of the tower 12 may be defined between the outer diameter 28 of the tower flange 25 and the mounting portion 37 of the foundation 14.

In addition, as shown in FIG. 3, the cylindrical wall 26 of the tower flange 25 further defines a vertical height 30. More specifically, the height 30 of the tower flange 25 may be oversized (i.e. thicker) to accommodate the radial offset 33 of the varying-sized foundations which are non-ideal structural geometries, e.g. where the main load path is radially offset due to the diameter of the mating component being larger or smaller.

Figure 4:
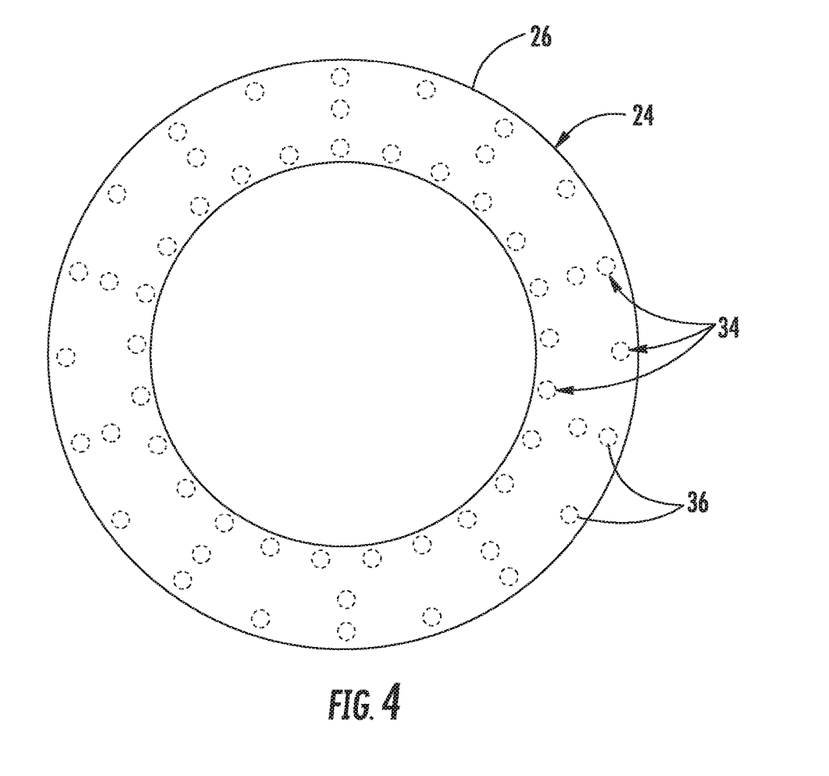
FIG. 4 illustrates a top view of one embodiment of a tower flange assembly according to the present disclosure, particularly illustrating a tower flange that can be configured with a plurality of different bolt hole patterns.

Referring now to FIG. 4, a top view of one embodiment of the tower flange 25 according to the present disclosure is illustrated, particularly illustrating a plurality of different bolt hole patterns 34 that may be machined therein to accommodate foundations of varying sizes. For example, as shown, the tower flange 25 may accommodate three separate rows of bolt holes 36 capable of aligning with a plurality of tower sections, foundation configurations, and/or yaw bearings. Thus, as mentioned, by having a larger radial thickness 29, the tower flange 25 is able to accommodate a wide range of bolt hole patterns such that the machined bolt hole pattern can be made to align with bolt hole pattern of the foundation without changing the forged tower flange. For example, as shown, the bolt hole pattern 34 may include varying spacing between bolt holes 36 and or varying diameters of bolt holes. Thus, as mentioned, the multiple bolt hole patterns 34 provide a one-size-fits-most tower flange 25.

Figure 5:
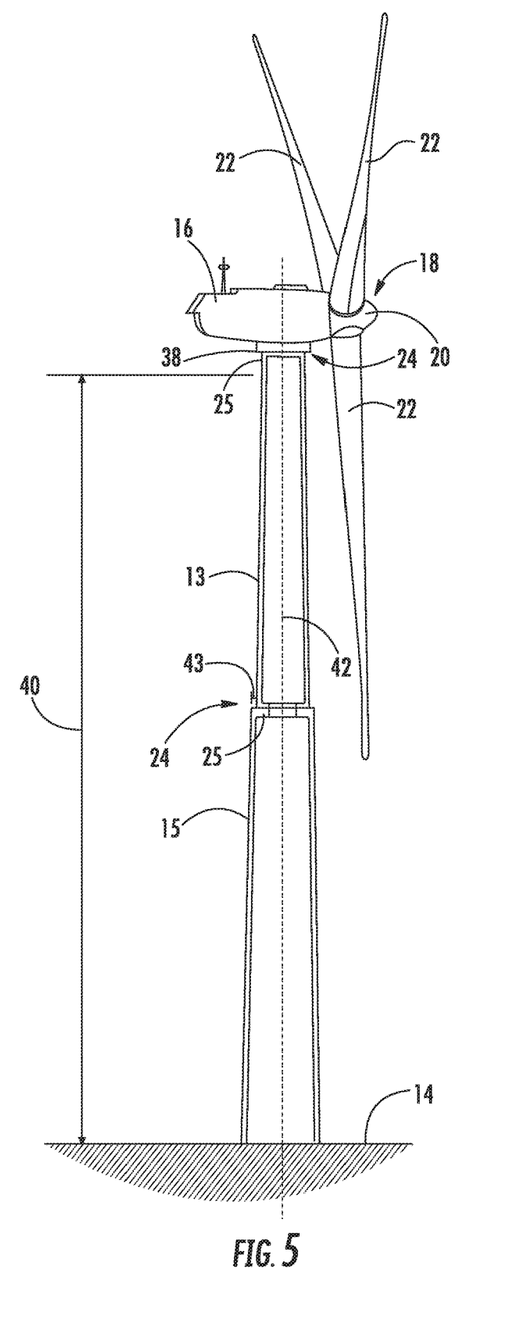
FIG. 5 illustrates a perspective view of one embodiment of a wind turbine according to the present disclosure, particularly illustrating a tower flange assembly at a mid-tower location and a tower flange assembly coupled to a yaw bearing atop the tower.

Referring now to FIG. 5, further embodiments of the tower assembly 24 of a wind turbine 10 according to the present disclosure are illustrated. More specifically, in one embodiment, the tower assembly 24 may include the larger tower flange 25 located at a mid-height location. As used herein, a "mid-height location" generally refers to any intermediate location along the vertical height of the tower 12 between the foundation 14 and the tower top. Thus, as shown, the large or mega tower flange 24 may be located at an intermediate location equal to about half of the tower height 40. In such embodiments, the radial thickness 29 of the tower flange is oversized to accommodate tower sections of varying sizes. More specifically, a radial offset 43 is defined between the outer diameter of the tower flange 25 and an outer diameter of at least one of the first tower section 13 or the second tower section 15. Further, as mentioned, the radial thickness 29 of the tower flange 25 (FIG. 3) may be greater than the radial thicknesses of the first and second tower sections 13, 15 so as to accommodate tower sections of varying sizes.

Figure 6:
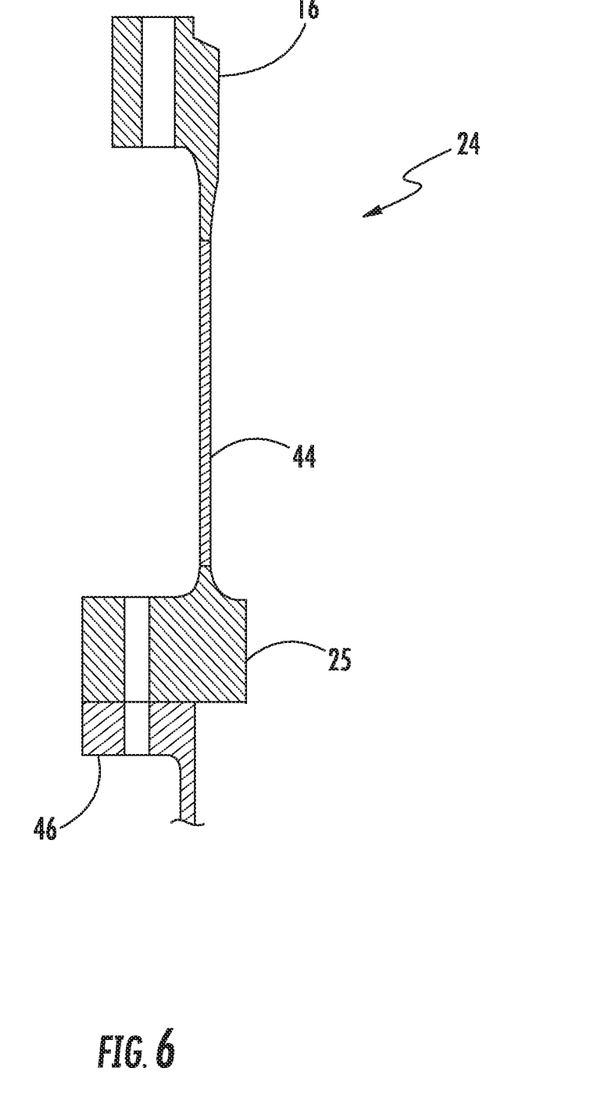
FIG. 6 illustrates a detailed view of one embodiment of the tower top tower flange assembly according to the present disclosure.
Figure 8:
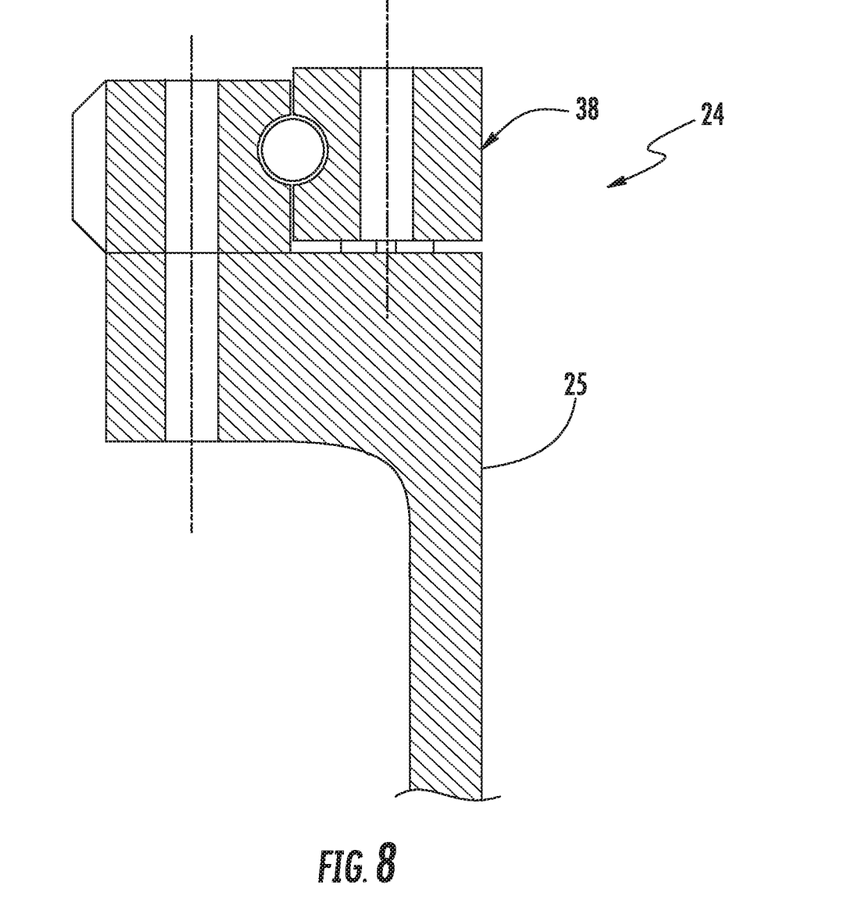
FIG. 8 illustrates a detailed view of one embodiment of the tower top tower flange assembly according to the present disclosure, particularly illustrating the tower flange connected to a yaw bearing via a first bolt hole pattern.
Figure 9:
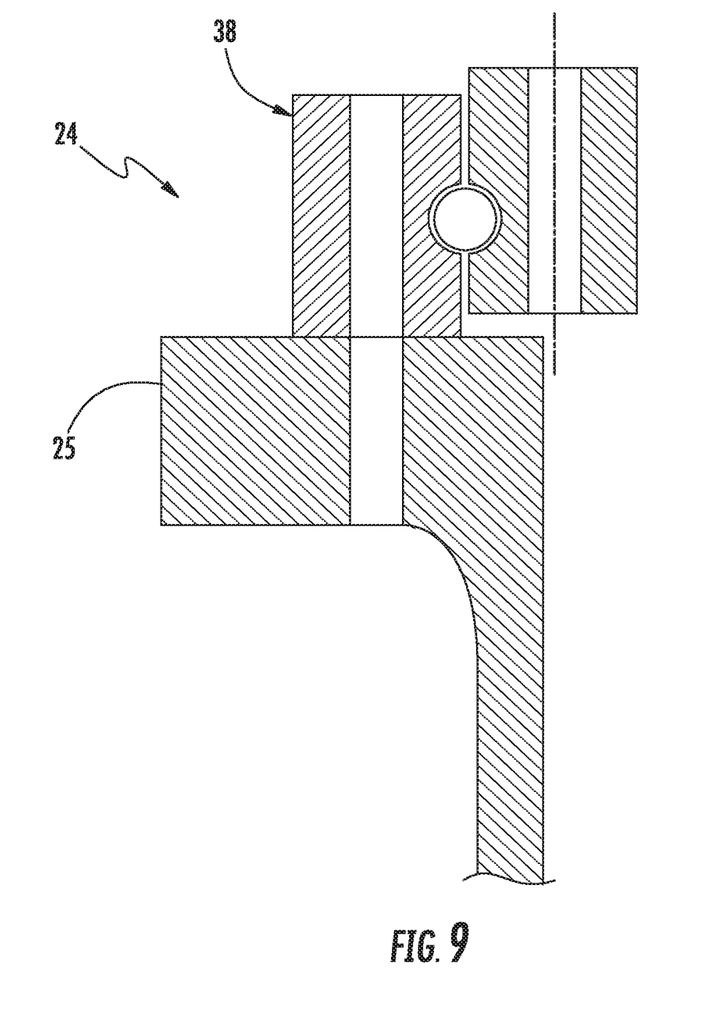
FIG. 9 illustrates a detailed view of another embodiment of the tower top tower flange assembly according to the present disclosure, particularly illustrating the tower flange connected to the yaw bearing via a second bolt hole pattern.

Referring now to FIGS. 5 and 6, the tower flange 25 may also be located uptower, e.g. integral with the upper tower section 13 of the wind turbine tower 12. More specifically, as shown in FIGS. 5, 8, and 9, the tower flange 25 may be bolted to a yaw bearing 38 that is coupled to the nacelle 16 of the wind turbine 10 to permit rotation of the nacelle 16 about a yaw axis 42. Like the other embodiments described herein, the radial thickness 29 of the tower flange 25 is greater than the radial thicknesses of conventional tower flanges so as to accommodate yaw bearings of varying sizes. Thus, as shown in FIG. 8, the tower flange 25 is bolted to the yaw bearing 38 via a first bolt hold pattern. Alternatively, as shown in FIG. 9, the tower flange 25 is bolted to the yaw bearing 38 via a second bolt hold pattern. As, FIGS. 8 and 9 illustrate how a single tower flange 25 can be machined to accommodate yaw bearings 38 of varying sizes.

Figure 7:
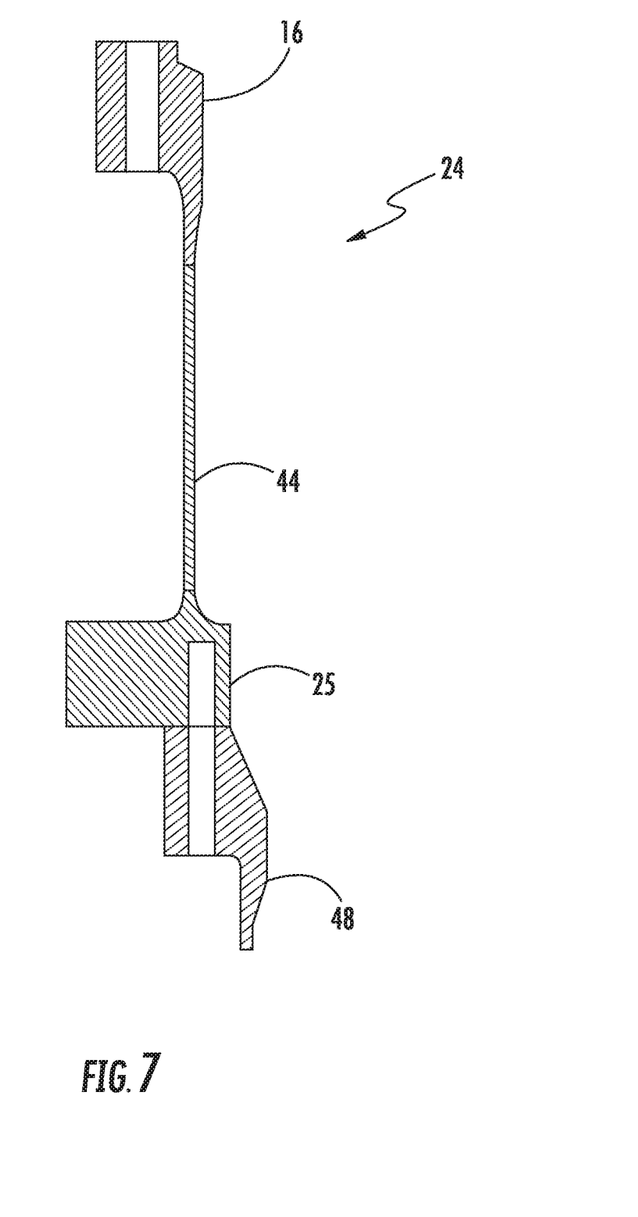
FIG. 7 illustrates a detailed view of another embodiment of the tower top tower flange assembly according to the present disclosure.

Referring particularly to FIGS. 6 and 7, the tower flange 25 may also be used with a tower adaptor 44 (or an additional tower section) such that the flange 25 can be easily coupled to the nacelle 16. In addition, as shown, the tower flange 25 of the present disclosure may accommodate multiple tower flanges 46, 48 or flanges of varying sizes. More specifically, FIG. 6 illustrates a detailed view of one embodiment of the tower top tower flange assembly 24 according to the present disclosure, particularly illustrating a tower flange 46 having a smaller diameter. In contrast, FIG. 7 illustrates a detailed view of another embodiment of the tower top tower flange assembly 24 according to the present disclosure, particularly illustrating a tower flange 48 having a larger diameter. Further, as shown, the tower flange 25 may be machined to accommodate at least two different bolt hole patterns to accommodate a first smaller tower section 46 and a second, larger tower section 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower assembly, comprising:
    a base tower section;
    a tower flange integral with the base tower section, the tower flange comprising a substantially cylindrical wall defining an outer diameter and an inner diameter separated by a radial thickness, the radial thickness being sized so as to accommodate foundations having mounting portions of different diameters; and,
    a foundation comprising a base portion and a mounting portion embedded within the base portion, the mounting portion defining an outer diameter and an inner diameter separated by a radial thickness, the tower flange accommodating the mounting portion of the foundation and being secured thereto,
    wherein the radial thickness of the tower flange is larger than the radial thickness of the mounting portion of the foundation,
    wherein the tower flange is further configured to accommodate a variety of bolt hole patterns, wherein a chosen bolt hole pattern for the tower flange is machined therein to align with a bolt hole pattern of the mounting portion, and
    wherein a radial offset is defined between the outer diameter of the tower flange and the outer diameter of the mounting portion of the foundation.

2. The tower assembly of claim 1, wherein the cylindrical wall of the tower flange further defines a height, the height being configured to accommodate structural geometries wherein a structural load path of the bas tower section is radially offset relative to a structural load path of the mounting portion.

3. The tower assembly of claim 1, wherein the outer diameter of the tower flange is greater than the outer diameter of the mounting portion of the foundation.

4. The tower assembly of claim 1, wherein the outer diameter of the tower flange is less than the outer diameter of the mounting portion of the foundation.

5. A tower assembly for a wind turbine, the tower assembly comprising:
    a first tower section;
    a second tower section defining an outer diameter, an inner diameter separated by a radial thickness, and a horizontal interface surface; and
    a tower flange integral with the first tower section, the tower flange comprising a substantially cylindrical wall defining an outer diameter and an inner diameter separated by a radial thickness, the radial thickness being sized so as to accommodate tower sections of different diameters, the tower flange defining a horizontal interface surface, the horizontal interface surface of the first tower section abutting the corresponding horizontal interface surface of the second tower section, wherein the radial thickness of the tower flange is larger than the radial thickness of the second tower section, and wherein a radial offset is defined between the outer diameter of the tower flange and an outer diameter of the second the second tower section.

6. The tower flange assembly of claim 5, wherein the first tower section corresponds to an upper tower section and the second tower section corresponds to a base tower section.

7. The tower flange assembly of claim 5, wherein the cylindrical wall of the tower flange further defines a height, the height being configured to accommodate structural geometries wherein a structural load path of the first tower section is radially offset relative to a structural load path of the second tower section.

8. The tower flange assembly of claim 5, wherein the outer diameter of the tower flange is greater than the outer diameter of the second tower section.

9. The tower flange assembly of claim 5, wherein the outer diameter of the tower flange is less than the outer diameter of the second tower section.

10. The tower flange assembly of claim 5, wherein the first and second tower sections comprise aligned bolt hole patterns.

11. A wind turbine, comprising:
a tower comprising at least one upper tower section, the upper tower section comprising a tower flange integral therewith, the tower flange comprising a substantially cylindrical wall defining an outer diameter and an inner diameter separated by a radial thickness, the radial thickness being sized so as to accommodate yaw bearings of different inner race outer diameters, the tower flange defining a first bolt hole pattern having a first diameter and a second bolt hole pattern having a second diameter so as to accommodate different yaw bearings having different diameters,
a nacelle configured atop the tower;
a yaw bearing coupled to the tower flange and the nacelle to permit rotation of the nacelle about a yaw axis, the yaw bearing comprising an inner race and an outer race; and,
wherein a radial offset is defined between the outer diameter of the tower flange and an outer diameter of the inner race of the yaw bearing.

12. The wind turbine of claim 11, wherein the radial thickness of the tower flange is greater than a radial thickness of the yaw bearing.

13. The wind turbine of claim 11, wherein the outer wall of the tower flange further defines a tower flange height, the tower flange height being configured to accommodate yaw bearing structural geometries wherein a structural load path of the yaw bearing is radially offset relative to a structural load path of the upper tower section.

14. The wind turbine of claim 11, wherein the outer diameter of the tower flange is greater than the outer diameter of the yaw bearing.

15. The wind turbine of claim 11, wherein the outer diameter of the tower flange is less than the outer diameter of the yaw bearing.

* * * * *